(12) United States Patent
Patey et al.

(10) Patent No.: US 9,715,595 B2
(45) Date of Patent: Jul. 25, 2017

(54) METHODS, SYSTEMS, AND DEVICES FOR SECURING DISTRIBUTED STORAGE

(71) Applicant: Morpho, Issy les Moulineaux (FR)

(72) Inventors: Alain Patey, Issy les Moulineaux (FR); Hervé Chabanne, Issy les Moulineaux (FR); Julien Bringer, Issy les Moulineaux (FR)

(73) Assignee: Morpho, Issy les Moulineaux (FR)

( * ) Notice: Subject to any disclaimer, the term of this patent is extended or adjusted under 35 U.S.C. 154(b) by 98 days.

(21) Appl. No.: 14/730,135

(22) Filed: Jun. 3, 2015

(65) Prior Publication Data

US 2015/0347781 A1 Dec. 3, 2015

(30) Foreign Application Priority Data

Jun. 3, 2014 (FR) ...................... 14 55041

(51) Int. Cl.
*G06F 21/62* (2013.01)
*H04L 9/08* (2006.01)
*H04L 9/32* (2006.01)

(52) U.S. Cl.
CPC ...... *G06F 21/6218* (2013.01); *G06F 21/6245* (2013.01); *H04L 9/085* (2013.01); *H04L 9/3231* (2013.01)

(58) Field of Classification Search
CPC ... H04L 9/085; H04L 9/3231; G06F 21/6218; G06F 21/6245
See application file for complete search history.

(56) References Cited

U.S. PATENT DOCUMENTS

2012/0163592 A1* 6/2012 Bellare .................. H04L 9/085
380/44
2015/0007258 A1 1/2015 Patey

FOREIGN PATENT DOCUMENTS

FR 2 984 559 A1 6/2013
WO 2008/127309 A2 10/2008

OTHER PUBLICATIONS

Bringer et al. (Biometric identification Using Secure Multiparty Computation, IEEE Signal Processing Magazine, Date of publication: Feb. 12, 2013, 11 pages).*
Dautrich, J.L., and C.V. Ravishankar, "Security Limitations of Using Secret Sharing for Data Outsourcing," in N. Cuppens-Boulahia et al. (eds.), Data and Applications Security and Privacy XXVI: 26th Annual IFIP WG 11.3 Conference, DBSec 2012, Paris, Jul. 11-3, 2012, Proceedings, Lecture Notes in Computer Science vol. 7371, Springer, Berlin, pp. 145-160.
Patil, S., et al., "Secret Sharing Schemes for Secure Biometric Authentication," International Journal of Scientific and Engineering Research 4(6):2890-2895, Jun. 2013.

(Continued)

*Primary Examiner* — Oleg Korsak
(74) *Attorney, Agent, or Firm* — Christensen O'Connor Johnson Kindness PLLC

(57) ABSTRACT

A method of secure distributed storage on N servers and a secure access method to confidential data stored in a secure and distributed manner on N servers are provided. Additionally, distributed storage, devices, systems, computer programs and storage medium are provided for the implementation of such methods.

12 Claims, 4 Drawing Sheets

(56) References Cited

OTHER PUBLICATIONS

Sarier, N.D., "Biometric Cryptosystems: Authentication, Encryption and Signature for Biometric Identities," Doctoral Dissertation, Mathematisch-Naturwissenschaftlichen Fakultät der Rheinischen Friedrich-Wilhelms-Universität Bonn, Jan. 2011, 257 pages.
Rapport de Recherche Préliminaire et Opinion Écrite, mailed Mar. 5, 2015, issued in corresponding French Application No. 1455041, filed Jun. 3, 2014, 12 pages.

* cited by examiner

METHODS, SYSTEMS, AND DEVICES FOR SECURING DISTRIBUTED STORAGE

CROSS-REFERENCE TO RELATED APPLICATION

The present application claims priority to French Application No. 14 55041, filed Jun. 3, 2014, under 35 U.S.C. §119, the disclosure of which is hereby expressly incorporated by reference in its entirety.

FIELD OF THE DISCLOSURE

The present disclosure relates generally to the field of the distributed storage of confidential data, and of later access to the confidential data stored as such.

Some aspects of the present disclosure relate in particular to the situation wherein the confidential data is biometric data, and wherein the later access aims to check if a candidate piece of biometric data corresponds to one of the pieces of biometric data stored in a distributed manner.

BACKGROUND

A distributed storage is able to be advantageous for many reasons. For example, there are storage solutions that are very reliable and at a very low cost in the Cloud, and it can be economically useful to store confidential data on the servers of a Cloud. Distributing the confidential data is able to make it possible in particular to increase their availability. As such, if the confidential data is stored redundantly, the loss or temporary unavailability of one of the servers used does not compromise (thanks to the redundant information available elsewhere) the access to the confidential data.

However, confidential data is, by definition, confidential, while distributed storage solutions (whether in the Cloud or elsewhere, including internally in a company) are often not very secure. Third parties (hackers, the government or foreign governments, subcontractors of the supplier of distributed storage, supplier of the distributed storage itself, employees of the user entity in case of distributed storage internal to the user entity, etc.) are as such able to access the stored data without authorisation.

It is therefore useful to protect the access to this data, but the known solutions render the access longer and are therefore penalising. Embodiments of the present disclosure aim therefore to improve the situation, among others.

SUMMARY

An aspect of the present disclosure relates to a method of secure distributed storage, on N servers, of confidential data, with the method comprising:

obtaining, by an obtaining electronic circuit of a recording device, of a piece of confidential data, obtaining, by an extraction electronic circuit of the recording device, of an approximated short representation of the confidential data using said confidential data, obtaining, by a sharing electronic circuit of the recording device, of N shares of the confidential data with a threshold t such that at least t shares are required in order to reconstitute the confidential data, and N short shares of the approximated short representation with a threshold t such that at least t short shares are required to reconstitute the approximated short representation, transmitting, by an emitter of the recording device, of each one of these N shares and of each one of these N short shares to a respective server among the N servers, in order to store them therein.

This method is advantageous in that it makes it possible to store the confidential data in a secure manner, i.e. without any one of the servers whatsoever able to access it or reconstitute it using the information to which it has access, even combined with the information to which at most t−1 other servers (among the N servers) have access.

This method is also advantageous in that it stores, for each share of the confidential data, an associated short share, which allows for a faster identification of the confidential data stored in a distributed manner during a method aimed at accessing such confidential data.

Another aspect of the present disclosure relates to a secure access method, by an access device, to confidential data stored in a secure and distributed manner on N servers, with the method comprising:

obtaining, by a sharing electronic circuit of the access device, of N short shares of an approximated short representation of a piece of confidential data to which an access is desired, with a threshold t such that at least t short shares are required to reconstitute the approximated short representation, transmitting, by an emitter of the access device, of each one of these N short shares to a respective server among the N servers, distributed calculating, by calculation circuits of the N servers, of the shares of the distances between the approximated short representation and each one of the K approximated short representations stored in a distributed manner on the N servers, transmitting, by an emitter of each server used, to a receiver of the access device, of the shares corresponding to the short representations of which the distance to the approximated short representation is less than a determined threshold, obtaining, by an obtaining electronic circuit of the access device, using shares received in the preceding step, of the corresponding confidential data.

This method is advantageous in that it allows for a rapid yet nevertheless secure identification of the confidential data stored in a distributed manner. The rapid identification is the result in particular of the recourse to approximated short representations.

With regards to performance (rapidity, bandwidth used, etc.), the access device does not need to download the entire database that constitutes all of the K*N shares of the K confidential data stored in a distributed manner on the N servers, and can perform research on a much more restricted and pertinent amount of confidential data. The access device can for this purpose set up a highly elaborated identification algorithm (chosen from those with the highest performance but therefore often the most complex of the state of the art) which would be excessively cumbersome (in calculations and/or in bandwidth) if it was performed on shares.

The recourse to a filtering by distance calculation (for example a Hamming distance) has a very low calculation cost and a cost in bandwidth that is not very high. As such, according to a possible implementation, the approximated short representations occupy 32 bytes each, and each server must send to each other server only 290 bytes per piece of confidential data stored in a distributed manner.

Another aspect of the present disclosure relates to a recording device for secure distributed storage, on N servers, of confidential data, with the recording device being arranged in order to implement a method of secure distributed storage according to an aspect of the present disclosure.

Another aspect of the present disclosure relates to a secure access system, by an access device, to confidential data stored in a secure and distributed manner on N servers, with the secure access system comprising the access device and the N servers. The secure access system is arranged in order to implement a secure access method according to an aspect of the present disclosure.

Another aspect of the present disclosure relates to a computer program comprising a series of instructions that, when they are executed by a processor, lead the processor into implementing a method according to an aspect of the present disclosure.

Another aspect of the present disclosure relates to a non-transitory storage medium that can be read by a computer, said support storing a computer program according to an aspect of the present disclosure.

DESCRIPTION OF THE DRAWINGS

Other aspects, purposes and advantages of the present disclosure shall appear when reading the description of a few of its embodiments.

The present disclosure shall also be better understood using the drawings, wherein.

DETAILED DESCRIPTION

Figure 1:
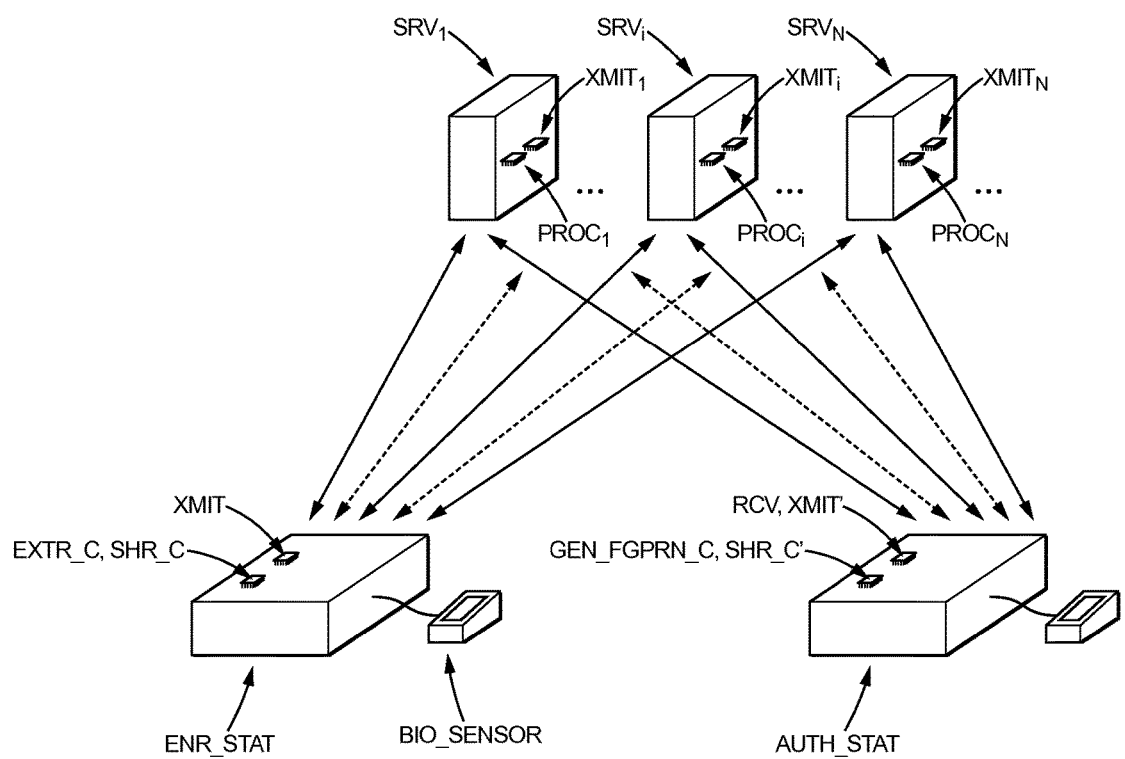
FIG. 1 shows a system according to a possible embodiment of the present disclosure.
Figure 2:
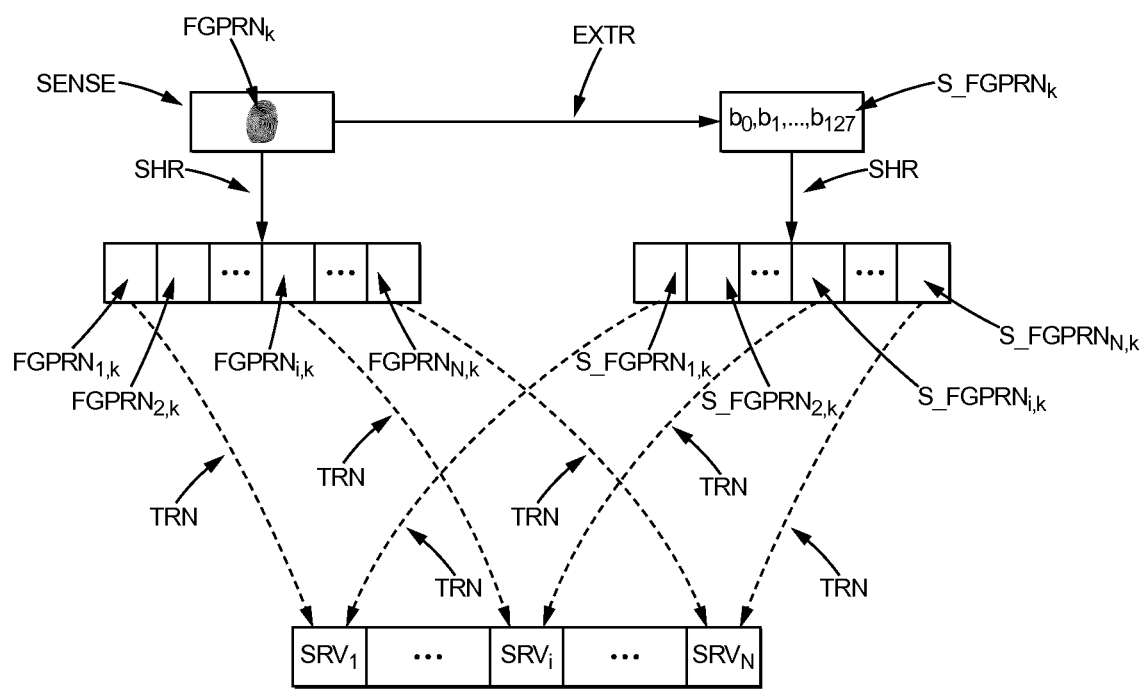
FIG. 2 shows a method of distributed storage according to a possible embodiment of the present disclosure.
Figure 3A:
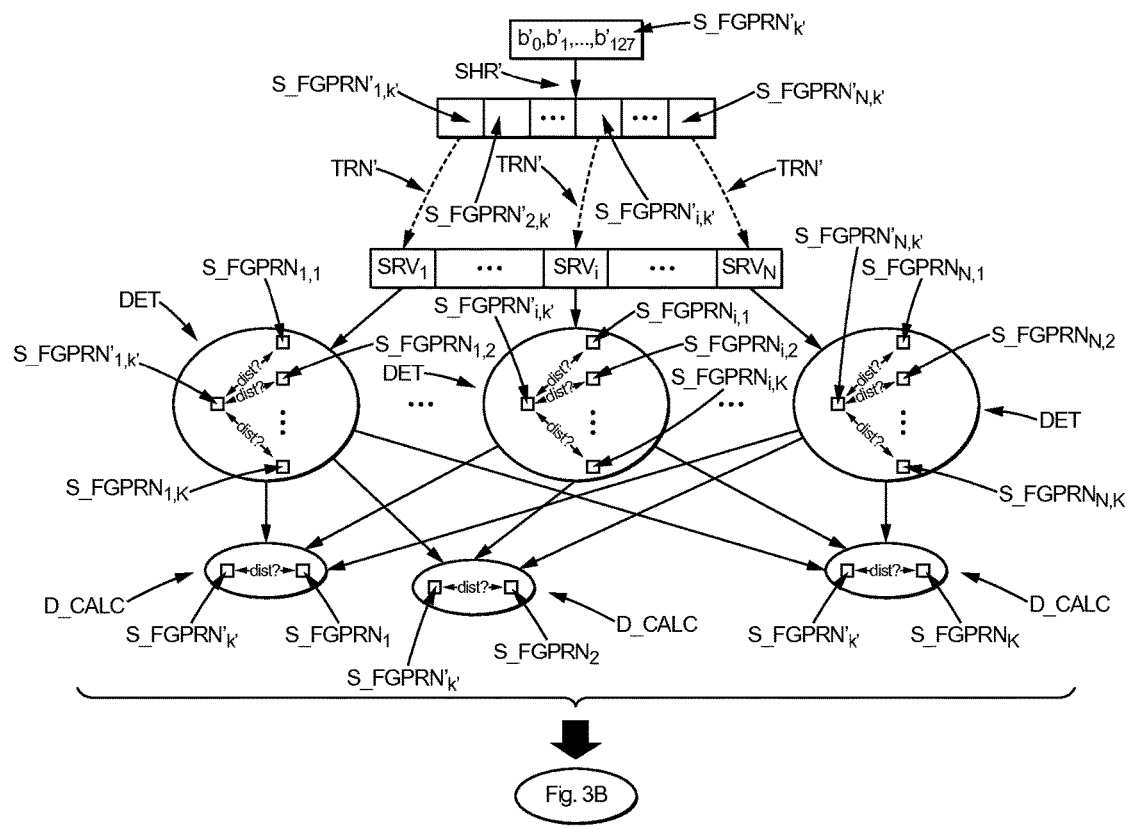
FIG. 3 (divided into a FIG. 3A and a FIG. 3B) shows a secure access method according to a possible embodiment of the present disclosure.
Figure 3B:
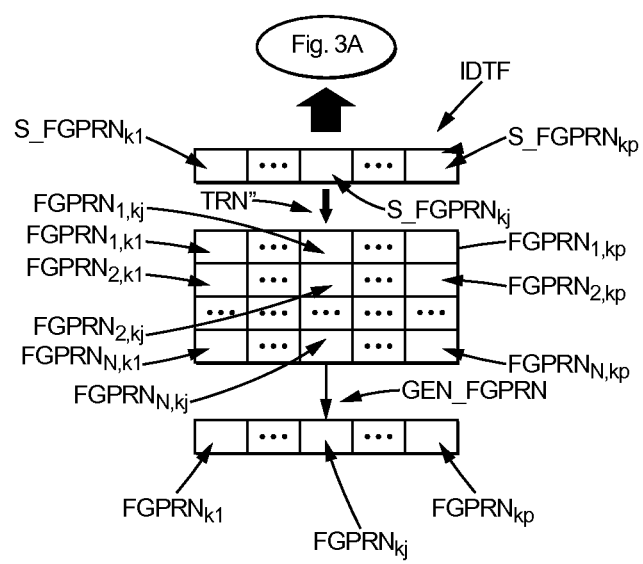

According to a first embodiment, a method of secure distributed storage, on N servers $SRV_1, \ldots SRV_i, \ldots SRV_N$, of confidential data, comprises an obtaining SENSE, by an obtaining electronic circuit BIO_SENSOR of a recording device ENR_STAT, of a piece of confidential data $FGPRN_k$. The data is confidential in that it is not supposed to be known by (or able to be determined by) any of the N servers whatsoever (taken individually) or any unauthorised third-party entity.

According to a possible implementation, the servers are physical servers of any suitable type.

Each piece of confidential data is, according to a possible implementation, a piece of biometric data (for example a fingerprint, an iris scan, or an image of a face), even a combination of several biometric data (face plus fingerprint, or several fingerprints corresponding to different fingers of the same individual, or fingerprint plus iris). According to a possible implementation, the confidential data is an IrisCode of 512 bytes, such as described in particular in John Daugman, "How iris recognition works", IEEE Trans. Circuits Syst. Video Techn. (TCSV) 14(1):21-30 (2004), the disclosure of which is hereby incorporated by reference in its entirety.

According to another implementation, the confidential data is documents, for example photographs, or documents of the text type.

The recording device ENR_STAT can be of a single piece or include several separate modules (the obtaining electronic circuit BIO_SENSOR can as such be integrated or on the contrary constitute a separate module connected to another module of the recording device ENR_STAT). According to a possible implementation, the recording device ENR_STAT is a biometric enrolment station (which can be for example a dedicated electronic device, that can take the form of a kiosk, or of a suitably programmed conventional computer). The obtaining electronic circuit is a biometric sensor BIO_SENSOR. The obtaining SENSE then comprises the obtaining of a piece of confidential data consisting of a piece of biometric data such as a fingerprint $FGPRN_k$.

According to another implementation, the recording device is a personal computer, for example a portable or desktop computer, a tablet, a smartphone, or a chip card. The obtaining electronic circuit is then a processor of the personal computer, coupled to a memory that stores a computer program that allows a user to select a document from among the documents stored on the personal computer. The obtaining then comprises the obtaining of a piece of confidential data consisting of a selected document (that was able to be created beforehand on this same personal computer personnel or be loaded thereon).

The method according to the first embodiment comprises an obtaining EXTR, by an extraction electronic circuit EXTR_C of the recording device ENR_STAT, of an approximated short representation $S\_FGPRN_k$ of the confidential data $FGPRN_k$ using said piece of confidential data $FGPRN_k$.

The extraction electronic circuit EXTR_C is for example a dedicated electronic circuit such as an FPGA, an ASIC, a PAL (or any other electronic component that can be configured), even an entirely custom-designed electronic component. According to another possible implementation, the extraction electronic circuit comprises both a processor and an associated memory (for example of the RAM, EEPROM, Flash, ROM, magnetic memory, optical memory, etc. type), with the associated memory storing a program that is able (when it is executed by the processor) to extract an approximated short representation $S\_FGPRN_k$ of the confidential data $FGPRN_k$ using said piece of confidential data $FGPRN_k$.

According to a possible implementation, the confidential data is a document, and the approximated short representation is an indexing of this document, for example a list of pertinent elements extracted from this document. According to a possible implementation, the confidential data is a text document and the indexing is a list of the most frequent keywords that appear in the text document (or a list of words selected according to rules that are more elaborate than simply the frequency of appearing). These keywords can each be represented by a condensate (for example through the application of a cryptographic hash function such as SHA-1), or by any arbitrary value that is easier to manipulate than the keyword itself (of which the length can be longer and variable). According to a possible implementation, the confidential data is a photograph and the indexing is based on a recognition of a form by a suitable electronic circuit. For example, if a human face, an automobile, a tree and/or a house are detected in the photograph, the indexing can include a list of identifiers of the various elements detected such as 0x0001 for a human face, 0x0002 for an automobile, 0x0003 for a tree and 0x0004 for a house.

According to a possible implementation, the confidential data is a piece of biometric data (for example a fingerprint). The obtaining EXTR of an approximated short representation $S\_FGPRN_k$ of the biometric data $FGPRN_k$ using said biometric data $FGPRN_k$ consists in extracting a short binary string. Similarly, in the case where the confidential data is for example a piece of biometric data representing an iris, the obtaining of the approximated short representation consists for example in extracting a set of 128 bits of IrisCodes from among those located in the portions that are the least often masked of the iris (as is described for example in Julien Bringer, Melanie Favre, Hervé Chabanne, and Alain Patey, Faster secure computation for biometric identification using filtering, In Anil K. Jain, Arun Ross, Salil Prabhakar, and Jaihie Kim, editors, ICB, pages 257-264. IEEE, 2012, the disclosure of which is hereby incorporated by reference in its entirety.). It is as such possible to extract bits that correspond to pixels that are separated from the eyelids and from the eyelashes so that in general this is not disturbed data, pixels which more preferably are chosen in such a way as not be too close in order to prevent them from being too correlated (so that they are more discriminating).

The method according to the first embodiment comprises an obtaining SHR, by a sharing electronic circuit SHR_C of the recording device ENR_STAT, of N shares $FGPRN_{1,k}$, $FGPRN_{2,k}$, ... $FGPRN_{i,k}$, ... $FGPRN_{N,k}$ of the confidential data $FGPRN_k$ with a threshold t such that at least t shares are required in order to reconstitute the confidential data $FGPRN_k$. The obtaining SHR also integrates an obtaining, by the sharing electronic circuit SHR_C, of N short shares $S\_FGPRN_{1,k}$, $S\_FGPRN_{2,k}$, ... $S\_FGPRN_{i,k}$, ... $S\_FGPRN_{N,k}$ of the approximated short representation $S\_FGPRN_k$ with a threshold t such that at least t short shares are required to reconstitute the approximated short representation $S\_FGPRN_k$.

The sharing electronic circuit SHR_C is for example a dedicated electronic circuit such as an FPGA, an ASIC, a PAL (or any other electronic component that can be configured), even an entirely custom-designed electronic component. According to another possible implementation, the sharing electronic circuit comprises both a processor and an associated memory (for example of the RAM, EEPROM, Flash, ROM, magnetic memory, optical memory, etc. type), with the associated memory storing a program that is able (when it is executed by the processor) to share the confidential data $FGPRN_k$ in N shares and to share the approximated short representation $S\_FGPRN_k$ in N short shares.

The sharing electronic circuit SHR_C as such implements a technique referred to as secret sharing, making it possible to protect this secret (the confidential data). As such, a single server (or a few servers) cannot learn anything about the confidential data using the elements that it has itself or that they have themselves, while if the number of servers grouped together exceeds a certain threshold (at least t servers), these servers can entirely reconstitute the confidential data that was shared. This technique makes it possible to protect the data in the case of access of an attacker on one (or on a few, less than the threshold) of the servers, with this attacker then not being able to discover the confidential data by exploiting the data present on the attacked servers.

In this context, it is possible, by using secure multi-party computation protocols (known under the acronym SMC or MPC), to perform calculations on the data shared as such. According to the types of calculations, the servers can perform these calculations locally on the data or have the need to interact with the other servers. The results obtained by the servers are then shares of the effective result to which the servers do not access as long as they do not put their shares together, as with initial data.

A possible secret sharing scheme is the one described in Adi Shamir, How to share a secret, Commun. ACM, 22(11): 612-613, 1979, the disclosure of which is hereby incorporated by reference in its entirety. This scheme is based on evaluating and interpolating polynomials. It is supposed that the data that the client wants to share belongs to a finite field Fq of characteristic p. An element ui belonging to Fq is assigned to each one of the servers $SRV_i$, in such a way that all of the elements ui are separate and not zero. The points ui are public. To simplify, ui=i for i=1 ... N can for example be posited. The sharing of a piece of data x by the recording device ENR_STAT is carried out in the following way. The recording device ENR_STAT (more precisely, its sharing electronic circuit SHR_C) randomly chooses a polynomial P of degree t−1 on Fq such that P(0)=x. The recording device ENR_STAT calculates the shares xi=P(ui), for i=1 ... N. Each xi as such represents a share of x. Other sharing schemes are of course possible.

The method according to the first embodiment comprises a transmission TRN, by an emitter XMIT of the recording device ENR_STAT, of each one ($FGPRN_{i,k}$) of these N shares $FGPRN_{1,k}$, $FGPRN_{2,k}$, ... $FGPRN_{i,k}$ ... $FGPRN_{N,k}$ and of each one ($S\_FGPRN_{i,k}$) of these N short shares $S\_FGPRN_{1,k}$, $S\_FGPRN_{2,k}$, ... $S\_FGPRN_{i,k}$, ... $S\_FGPRN_{N,k}$ to a respective server $SRV_i$ among the N servers $SRV_1$, ... $SRV_i$, ... $SRV_N$, in order to store them therein.

At the end of the method, a distributed storage on N servers is as such obtained. By reiterating the method K times for K different pieces of confidential data, the method obviously makes it possible to store K confidential data.

In FIG. 1, the sharing electronic circuit SHR_C and the extraction electronic circuit EXTR_C are integrated into a single and same circuit containing a processor (shared) and a memory storing a program for the implementation of the sharing functions and a program for the implementation of the extraction functions. However, the two circuits can also be entirely separate.

A second embodiment relates to a secure access method, by an access device AUTH_STAT, to confidential data stored in a secure and distributed manner on N servers $SRV_1$, ... $SRV_i$, ... $SRV_N$.

According to a possible implementation, the confidential data stored in a secure and distributed manner on the N servers $SRV_1$, ... $SRV_i$, ... $SRV_N$ is stored according to a method according to the first embodiment, or according to any method able to initialise the N servers in the same way as a method according to the first embodiment.

According to a possible implementation, the access device AUTH_STAT is an authentication station (able to take the form of a dedicated electronic device, or of a suitably programmed conventional computer and provided with a biometric sensor). A user wanting to authenticate himself goes to the authentication station. The method carries out a biometric capture on the user. This capture can be carried out in a manner similar to that of the step of obtaining SENSE of the corresponding method of enrolment. This biometric capture is supposed to correspond to a biometric print of the user that the user captured beforehand during an enrolment phase, having led to the distributed storage of this prior biometric print on the N servers. This is at least what the secure access method aims to establish. The method then carried out an extraction of an approximated short representation (qualified hereinbelow as a first approximated short representation) corresponding to the captured biometric print.

According to another possible implementation, the access device is a personal computer, for example a portable or desktop computer, a tablet, a smartphone or a chip card. A user wants to search, using the access device, for a confidential document stored in a distributed manner on the N servers based on a given indexing. The method according to the second embodiment proceeds with the entering of an approximated short representation (for example, an indexing) that corresponds to the confidential data sought. This approximated short representation is qualified hereinbelow as a second approximated short representation. The indexing is for example a series of keywords entered freely by the user (for example using a keyboard) or chosen from a list of keywords, or (in a manner that is easier to manipulate during a distance measurement), a series of condensates obtained using each one of these keywords (for example condensates calculated using a cryptographic hash algorithm such as SHA-1 or any other suitable cryptographic hash algorithm), or a series of pointers or index or other numerical values associated each one associated to one of the keywords. The indexing used during the distributed recording and secure access methods is of the same type (so that the identification based on the indexing is able to function), i.e. two identical pieces of confidential data used during the recording (on the one hand) and during the secure access (on the other hand) have the same approximated short representations.

According to a possible implementation, the access device AUTH_STAT and the recording device ENR_STAT are integrated within a single and same device. According to another implementation, these are separate devices, even devices of separate types.

A method according to the second embodiment comprises an obtaining SHR', by a sharing electronic circuit SHR_C' (of a type similar to the sharing electronic circuit SHR_C described hereinabove, even identical) of the access device AUTH_STAT of N short shares $S\_FGPRN'_{1,k'}$, $S\_FGPRN'_{2,k'}$, ... $S\_FGPRN'_{i,k'}$, ... $S\_FGPRN'_{N,k'}$ of an approximated short representation $S\_FGPRN'_{k'}$ of a piece of confidential data to which an access is desired, with a threshold t such that at least t short shares are required to reconstitute the approximated short representation $S\_FGPRN'_{k'}$. The approximated short representation $S\_FGPRN'_{k'}$ corresponds for example to an approximated short representation of a fingerprint. This can more generally be the aforementioned first approximated short representation, or the aforementioned second approximated short representation.

A method according to the second embodiment comprises a transmission TRN', by an emitter XMIT' of the access device AUTH_STAT, of each one ($S\_FGPRN'_{i,k'}$) of these N short shares $S\_FGPRN'_{1,k'}$, $S\_FGPRN'_{2,k'}$, ... $S\_FGPRN'_{i,k'}$, ... $S\_FGPRN'_{N,k'}$ to a respective server $SRV_i$ among the N servers $SRV_1$, ... $SRV_i$, ... $SRV_N$. Each server $SRV_i$ as such receives a short share for which it is supposed to search for one or several potentially corresponding short share(s) among those that it has stored.

According to a possible implementation, a method according to the second embodiment comprises a determination DET, at least partially local to each server $SRV_i$, by a calculation circuit $PROC_i$ of each server $SRV_i$, of K distances measured between the short share $S\_FGPRN'_{i,k'}$ received by this server $SRV_i$ and K short shares $S\_FGPRN_{i,1}$, $S\_FGPRN_{i,2}$, ... $S\_FGPRN_{i,K}$ that this server $SRV_i$ has stored beforehand. Increased security results in particular from the determination at least partially local to each server of pertinent distances, which means that the information held by each server is not (in any case not entirely) shared with other servers, which as such reduces the risks of attacks. More precisely, with regards to security, thanks to the method proposed, the servers never individually have unencrypted access to the confidential data of other servers, or even to the corresponding approximated short representations, but solely to distances, corresponding to filtering scores. Only the access device has, at the end of the method, access to confidential data.

According to a possible implementation, the short shares are associated with a piece of confidential data comprising several biometric prints. Each short share comprises, according to a possible implementation, several sub short shares. According to a possible implementation, measuring the distance (analysed as a measurement of the similarity calculated in order to filter the data stored in a distributed manner and to identify as such the most pertinent data) is for each short share a series of measurements of distances (for each one of the sub shares, associated with separate biometric prints), followed by a combination of these measures (for example: sum, sum of the squares, maximum/minimum, etc.). According to a possible implementation, the method of access is arranged so that the servers do not reveal the intermediate results (measurement of distances before combining them), but solely the result of the combination.

The calculating electronic circuit $PROC_i$ is for example a dedicated electronic circuit such as a FPGA, an ASIC, a PAL (or any other electronic component that can be configured), even an entirely custom-designed electronic component. According to another possible implementation, the calculating electronic circuit comprises both a processor and an associated memory (for example of the RAM, EEPROM, Flash, ROM, magnetic memory, optical memory, etc. type), with the associated memory storing a program that is able (when it is executed by the processor) to calculate the pertinent distance (where applicable by calling upon other servers among the N servers).

The fact that the determination is at least partially local means that this determination in particular implies the use of sensitive data which is local (namely which is directly stored in the server $SRV_i$, and which does not leave the server $SRV_i$, as such preserving the confidentiality of its content with regards to third-party entities such as other servers). Data is sensitive if access to this data is able (possibly in combination with access to other data) to make it possible to reveal confidential data The calculating electronic circuit $PROC_i$ as such determines the distance of the short share submitted to each one of the short shares stored in the server $SRV_i$, which makes it possible to carry out a filter based on the distance criterion (Hamming distance, other Euclidian distance, scalar product, etc.).

A method according to the second embodiment comprises a distributed calculation, by calculating circuits $PROC_1$, ... $PROC_i$, ... $PROC_N$ (of the aforementioned type) of the N servers $SRV_1$, ... $SRV_i$, ... $SRV_N$, of the distances (in reality, of the shares of the distances) between the approximated short representation $S\_FGPRN'_{k'}$ and each one of the K approximated short representations $S\_FGPRN_1$, $S\_FGPRN_2$, ... $S\_FGPRN_K$ stored in a distributed manner on the N servers $SRV_1$, ... $SRV_i$, ... $SRV_N$. For example, the distances between the approximated short representation $S\_FGPRN'_{k'}$ and each one of the K approximated short representations $S\_FGPRN_1$, $S\_FGPRN_2$, ... $S\_FGPRN_K$ are calculated on the basis of N*K shares of distances measured in the preceding optional step (determination DET). As such, based on the shares of distances between the short shares comprising the approximated short representations, the method is able to determine the distance between the approximated short representations. This step of distributed calculation requires sharing between the servers only information pertaining to the distances (for example the distance between the approximated short representations), and not directly information stored in these servers. This as such limits the leakage of information that can be used by potential attackers. For example, according to a possible implementation, the distance of two approximated short representations is defined as the sum of the distances of the respective shares of these two approximated short representations. According to a possible implementation, the distributed calculation consists in transmitting all of the shares of distances between shares (each one held by a respective server) to an entity (for example the access device AUTH_STAT) which adds all of them together and returns the result to each server. According to another possible implementation, the servers $SRV_i$ exchange the shares of distances between shares that they have calculated so that each one can determine the distance (of the two approximated short representations) that result.

According to a possible implementation, the measuring of distance shares between short shares is secure according to the protocol described in Takashi Nishide and Kazuo Ohta, Multiparty computation for interval, equality, and comparison without bit-decomposition protocol, In Tatsuaki Okamoto and Xiaoyun Wang, editors, Public Key Cryptography, volume 4450 of Lecture Notes in Computer Science, pages 343-360, Springer, 2007, the disclosure of which is hereby incorporated by reference in its entirety. In particular, this protocol can be used after having calculated the shares of the distances. Instead of bringing the shares together and examining which distances are sufficiently low, it is as such possible to continue to perform secure calculations on the shares, which reveal at most the information according to which the distance between the short representations is (or is not) less than or equal to the threshold.

A method according to the second embodiment comprises a transmission TRN" (broken down into p*NN transmissions of shares, NN being between t and N, with the value NN=N being advantageous), by an emitter $XMIT_i$ of each server $SRV_i$ used (i.e. between t and N servers for each piece of confidential data), to a receiver RCV of the access device AUTH_STAT, of the shares $FGPRN_{i,k1}, \ldots FGPRN_{i,kj}, \ldots FGPRN_{i,kp}$ corresponding to the short representations $S\_FGPRN_{k1}, \ldots S\_FGPRN_{kj}, \ldots S\_FGPRN_{kp}$ of which the distance to the approximated short representation $S\_FGPRN'_{k'}$ is less than (or equal) to a determined threshold. The p shares $FGPRN_{i,k1}, \ldots FGPRN_{i,kj}, \ldots FGPRN_{i,kp}$ correspond to the short representations $S\_FGPRN_{k1}, \ldots S\_FGPRN_{kj}, \ldots S\_FGPRN_{kp}$ in the terms that each one of these p shares can be used (in combination with at least t−1 other shares corresponding to t−1 different indices i) in order to reconstruct the respective confidential data $FGPRN_{k1}, \ldots FGPRN_{kj}, \ldots FGPRN_{kp}$ of which the short representations $S\_FGPRN_{k1}, \ldots S\_FGPRN_{kj}, \ldots S\_FGPRN_{kp}$ are short representations. The method comprises a possibly separate step of identification IDTF, among all of the short representations, short representations $S\_FGPRN_{k1}, \ldots S\_FGPRN_{kj}, \ldots S\_FGPRN_{kp}$ of which the distance is less than (or equal) to said threshold. This threshold can be zero. In this hypothesis, only shares of confidential data of which the approximated short representations are strictly equal to that which is sought are transmitted. If the threshold (necessarily positive or zero) is strictly greater than zero, then a potentially more substantial set of shares of confidential data is transmitted, which is opportune in the case of a biometric authentication (as the probability that two separate sensors of the same biometric print are strictly equal is generally very low).

A method according to the second embodiment comprises an obtaining GEN_FGPRN, by an obtaining electronic circuit GEN_FGPRN_C of the access device AUTH_STAT, using shares received in the preceding step $FGPRN_{i,k1}, FGPRN_{1,kj}, \ldots FGPRN_{1,kp}, FGPRN_{2,k1}, \ldots FGPRN_{2,kj}, \ldots FGPRN_{2,kp}, FGPRN_{N,k1}, \ldots FGPRN_{N,kj}, \ldots FGPRN_{N,kp}$, of the corresponding confidential data $FGPRN_{k1}, \ldots FGPRN_{kj}, \ldots FGPRN_{kp}$. It is of course not indispensable to transmit the N shares for each piece of confidential data. According to a possible implementation, only t shares are transmitted for each piece of confidential data. According to another implementation, the method transmits a number of shares between t+1 and N.

The obtaining electronic circuit GEN_FGPRN is for example a dedicated electronic circuit such as an FPGA, an ASIC, a PAL (or any other electronic component that can be configured), even an entirely custom-designed electronic component. According to another possible implementation, the obtaining electronic circuit comprises both a processor and an associated memory (for example of the RAM, EEPROM, Flash, ROM, magnetic memory, optical memory, etc. type), with the associated memory storing a program that is able (when it is executed by the processor) to generate the pertinent confidential data according to the shares received (with the shares $FGPRN_{1,k1}, \ldots FGPRN_{2,k1}, \ldots FGPRN_{N,k1}$ making it possible to generate the confidential data $FGPRN_{k1}$, and so on). To generate as such (or reconstitute) a piece of confidential data x (for example $FGPRN_{k1}$) using at least t shares obtained according to the aforementioned Shamir scheme, the obtaining electronic circuit uses Lagrange's interpolation, which makes it possible to find the polynomial P used for the sharing of x. The obtaining electronic circuit then finds x by evaluating P as 0.

This second embodiment is advantageous in relation to the state of the art in particular in that the operations required for a conventional identification calculation, although theoretically able to be carried out by using secure multi-party computation calculations, generate a cost in calculations and in bandwidth between the servers that is too high to be able to be used in practice (at least for current applications). The second embodiment simultaneously takes into account the constraints of SMC and of the type of confidential data by using filtering techniques when identifying the confidential data or piece of confidential data.

The operations in the "shared area" are as such reduced for the most part to a distance calculation (avoiding having to communicate all of the intermediate results).

In FIG. 1, the sharing electronic circuit SHR_C' and the obtaining electronic circuit GEN_FGPRN are integrated into a single and same circuit containing a processor (shared) and a memory that stores a program for the implementation of sharing functions and a program for the implementation of the obtaining functions. However, the two circuits can also be entirely separate. In this same figure, the receiver RCV and the emitter XMIT' are a single and same circuit (such as the electronics of a network card), but of course it is possible to use separate circuits.

According to a third embodiment, the distributed calculation D_CALC of a secure access method according to the second embodiment comprises a determination DET, by a calculation circuit $PROC_i$ of each server $SRV_i$, of K shares of distances measured between:

the short share $S\_FGPRN'_{i,k'}$, received by this server $SRV_i$, of the confidential data to which an access is desired; and K short shares $S\_FGPRN_{i,1}, S\_FGPRN_{i,2}, \ldots S\_FGPRN_{i,K}$ that this server $SRV_i$ has stored beforehand.

N*K shares of distances are therefore as such determined (K shares of distances per server).

The method measures the distance between the approximated short representation $S\_FGPRN'_{k'}$ of the confidential data to which an access is desired and a short representation S_FGPRN$_j$ stored in a distributed manner on the N servers SRV$_1$, SRV$_i$, SRV$_N$ by combining (for example by adding), among said N*K shares of distances, the N shares of distances measured respectively by each server SRV$_i$ between:

the short share S_FGPRN$_{i,j}$ of the short representation S_FGPRN$_j$ stored on this server SRV$_i$; and the corresponding short share S_FGPRN'$_{i,k'}$ of said approximated short representation received by this server SRV$_i$.

According to a fourth embodiment, the distributed calculation D_CALC of a secure access method according to the second embodiment comprises a determination DET, by a calculation circuit PROC$_i$ of each server SRV$_i$, of K shares of distances measured between:

the short share S_FGPRN'$_{i,k'}$, received by this server SRV$_i$, of the confidential data to which an access is desired; and K short shares S_FGPRN$_{i,1}$, S_FGPRN$_{i,2}$, . . . S_FGPRN$_{i,K}$ that this server SRV$_i$ has stored beforehand.

N*K shares of distances are therefore as such determined (K distances per server).

The method carries out a secure comparison between a threshold and the distance measured between the approximated short representation S_FGPRN'$_{k'}$ of the confidential data to which an access is desired and a short representation S_FGPRN$_j$ stored in a distributed manner on the N servers SRV$_1$, SRV$_i$, SRV$_N$. The distance is measured by applying a secure protocol (for example the protocol of Takashi Nishide and Kazuo Ohta) for calculating the distance at N shares of distances, among said N*K shares of distances, said N shares of distances being the distances measured respectively by each server SRV$_i$ between:

the short share S_FGPRN$_{i,j}$ of the short representation S_FGPRN$_j$ stored on this server SRV$_i$; and the corresponding short share S_FGPRN'$_{i,k'}$ of said approximated short representation received by this server SRV$_i$.

This fourth embodiment is advantageous in particular in that it makes it possible that only the shares of the result of the comparison are gathered together. The servers can as such learn of the list of candidates but not the distances.

According to a fifth embodiment, the K distances measured according to a secure access method according to one of the second to the fourth embodiments are K Hamming distances.

Details of a particular example of the fifth embodiment are provided hereinbelow. The method (comprising the aforementioned step of determination DET) comprises, for the calculation of a Hamming distance between a short share S_FGPRN'$_{i,k'}$ of the approximated short representation (S_FGPRN'$_{k'}$) of the confidential data to which an access is desired and a short share S_FGPRN$_{i,j}$ stocked beforehand in a server SRV$_i$, a secure distributed calculation, by calculating circuits PROC$_1$, . . . PROC$_i$, . . . PROC$_N$ of the N servers SRV$_1$, . . . SRV$_i$, . . . SRV$_N$, of the product of said two short shares S_FGPRN'$_{i,k'}$, S_FGPRN$_{1,j}$.

The method comprises a local calculation, by a calculation circuit PROC$_i$ of said server SRV$_i$, of the double of said product of said two short shares S_FGPRN'$_{i,k'}$, S_FGPRN$_{i,j}$.

The method comprises a local calculation, by a calculation circuit PROC$_i$ of said server SRV$_i$, of a sum of said two short shares S_FGPRN'$_{i,k'}$, S_FGPRN$_{i,j}$.

The method comprises a local calculation, by a calculation circuit PROC$_i$ of said server SRV$_i$, of the Hamming distance by subtraction of said double of said product of said two short shares S_FGPRN'$_{i,k'}$, S_FGPRN$_{i,j}$ from said sum of said two short shares S_FGPRN'$_{i,k'}$, S_FGPRN$_{1,j}$.

This particular example of the fifth embodiment is as such based on a method of sharing such that:

Using a share xi of a piece of confidential data x and a share yi of another piece of confidential data y, a server SRV$_i$ can calculate a share zi of z=x+y, without interaction with the other servers or with the access device AUTH_STAT and without ever having access to x or to y;

Using a share xi of x and an integer n, the server SRV$_i$ can calculate a share zi of z=n*x (=x+x+ . . . +x n times), without interaction with the other servers or with the access device AUTH_STAT and without ever having access to x;

Using a share xi of x and a share yi of y, the server SRV$_i$ can calculate a share zi of z=x*y, by interacting with the other servers, without interactions with the access device AUTH_STAT and without knowing x or y.

The servers are not supposed to obtain information on the confidential data that they manipulate, and a method according to the present disclosure gives them access only to shares of this data, and to results of the resulting calculations of these shares. The document R. Cramer, I. Damgard, and J. B. Nielsen. Secure Multiparty Computation and Secret Sharing—An Information Theoretic Approach. Book Draft, 2012, provides details on secret sharing, SMC and techniques that can be used for the addition and the multiplication. This type of technique was initially described in Michael Ben-Or, Shafi Goldwasser, Avi Wigderson, "Completeness Theorems for Non-Cryptographic Fault-Tolerant Distributed Computation", STOC 1988:1-10. Both of these documents referenced in this paragraph are hereby incorporated by reference in their entirety.

To calculate a Hamming distance between two elements, it is usual to calculate an exclusive or (XOR) between the two elements. But according to a possible implementation, the elements for which it is desired to determine the Hamming distance separating them are divided into bits, and each bit is represented by an element of a field (with the field having the characteristic of being greater than or equal to the number of shares N, N also being the number of servers SRV$_i$). In addition, the characteristic must also be larger than the maximum distance between two short representations. For example, for a Hamming distance over 128 bits, the characteristic must be greater than 128. For example, the elements are approximated short representations of 128 bits, with the 128 bits of an approximated short representation being divided into 128 individual bits, each one represented by one byte. An approximated short representation is as such represented by a set of 128 bytes (each one identifying an element of a field).

It is often impossible to calculate an XOR between two elements by the conventional technique (consisting, when two corresponding bits are identical, in defining the output bit to 0, and when they are different, in defining the output bit to 1). In the aforementioned example, the 128 bytes each represent an element of a field wherein XOR does not function in this way (a conventional XOR of the bytes representing each bit does not provide any pertinent information).

According to a possible implementation, the method therefore implements the XOR via an alternative technique consisting (in order to calculate a XOR b, with a and b being two elements of a field) in performing the similar calculation: a+b−2·a*b (+ and * respectively designating the law of addition and the law of multiplication of the field, and · designating the law of multiplication by a scalar). If a and b are equal (both represent the bit 0 or both represent the bit 1), a+b−2·a*b is zero, and if a and b represent two different bits (0 and 1 or 1 and 0), a+b−2·a*b is equal to 1.

The addition a+b does not pose any particular difficulty: it is preserved. For example, if the elements a and b multiplied are represented by polynomials, their addition (addition of the polynomials) does not change the degree of the polynomial and does not pose any difficulty.

But the multiplication a*b is more complex: it involves in order to determine each product a*b, an interactive mechanism that involves servers other than the sole server concerned (storing a and b). For example, if the multiplied elements are represented by polynomials, their multiplication is a polynomial of a degree that can be different, which generally poses difficulties, resolved by the interactive mechanism.

For the purposes of illustration, in the hypothesis where it is desired to work over 128 bits, the method can include the following phases.

In an initial phase referred to as sharing, the method, after having encoded each "bit" i from 1 to 128 (seen as a 0 or a 1) of a short representation on an element xi (representing the respective bit) of the field under consideration, shares each element xi in N shares $xi_1, \ldots, xi_N$ distributed between the N various servers.

In a distance calculation phase aimed at determining the Hamming distance between x (represented by its shares xi) and y (represented by its shares yi), for each coordinate i from 1 to 128, the server j calculates a share zij of zi=(xi+ yi−2 xi yi) by using for example one of the aforementioned techniques (the sums are calculated locally by the server j and the multiplications use interactions with all of the other servers). Then the method calculates a share of the sum of the zi, for i from 1 to 128. This gives a share of the Hamming distance (which is the sum of the XOR bit by bit). The Hamming distance between x and y is obtained by calculating the sum of the Hamming distances between xi and yi for any i from 1 to 128.

According to a sixth embodiment, the confidential data of a secure access method according to one of the second to the fifth embodiments are biometric data.

According to a possible implementation, the biometric data of which the approximated short representation $S\_FGPRN'_k$ is extracted is a candidate biometric print that the method aims to authenticate. The method then comprises (after regenerating pertinent biometric data by the obtaining electronic circuit GEN_FGPRN) a comparison of the candidate biometric print with each one of the prints of all of the biometric prints generated using the shares received. If one of them is the correct one, the user is authenticated, otherwise (if none of the biometric prints correspond), the user is not authenticated.

According to another embodiment, the confidential data of a secure access method according to one of the second to the fifth embodiments is a document (text, photograph, etc.). According to a possible implementation of this embodiment, the method displays (or makes it possible to display) all of the documents generated using the shares. The user can then select the one or ones that he was seeking.

According to a seventh embodiment, a recording device ENR_STAT for secure distributed storage, on N servers $SRV_1, \ldots SRV_i, \ldots SRV_N$, of confidential data, comprises an obtaining electronic circuit BIO_SENSOR of a piece of confidential data $FGPRN_k$.

The recording device ENR_STAT comprises an extraction electronic circuit EXTR_C of an approximated short representation $S\_FGPRN_k$ of the confidential data $FGPRN_k$ using said piece of confidential data $FGPRN_k$.

The recording device ENR_STAT comprises a sharing electronic circuit SHR_C of the confidential data $FGPRN_k$ in N shares $FGPRN_{1,k}, FGPRN_{2,k}, \ldots FGPRN_{i,k}, \ldots FGPRN_{N,k}$ with a threshold t such that at least t shares are required in order to reconstitute the confidential data $FGPRN_k$, and of the approximated short representation $S\_FGPRN_k$ in N short shares $S\_FGPRN_{1,k}, S\_FGPRN_{2,k}, \ldots S\_FGPRN_{i,k}, \ldots S\_FGPRN_{N,k}$ with a threshold t such that at least t short shares are required to reconstitute the approximated short representation $S\_FGPRN_k$.

The recording device ENR_STAT comprises an emitter XMIT arranged to transmit each one $FGPRN_{i,k}$ of these N shares $FGPRN_{1,k}, FGPRN_{2,k}, \ldots FGPRN_{i,k}, \ldots FGPRN_{N,k}$ and each one $S\_FGPRN_{i,k}$ of these N short shares $S\_FGPRN_{1,k}, S\_FGPRN_{2,k}, \ldots S\_FGPRN_{i,k}, \ldots S\_FGPRN_{N,k}$ to a respective server $SRV_i$ among the N servers $SRV_1, \ldots SRV_i, \ldots SRV_N$, in order to store them therein.

The details of the implementation of the method according to the first embodiment are transposed to the device according to the seventh embodiment and reciprocally.

According to an eighth embodiment, a secure access system, by an access device AUTH_STAT, to confidential data stored in a secure and distributed manner on N servers $SRV_1, \ldots SRV_i, \ldots SRV_N$, comprises the access device AUTH_STAT and the N servers $SRV_1, \ldots SRV_i, \ldots SRV_N$.

The access device AUTH_STAT comprises a sharing electronic circuit SHR_C' of an approximated short representation $S\_FGPRN'_{k'}$ of a piece of confidential data to which an access is desired in N short shares $S\_FGPRN'_{1,k'}, S\_FGPRN'_{2,k'}, \ldots S\_FGPRN'_{i,k'}, \ldots S\_FGPRN'_{N,k'}$ with a threshold t such that at least t short shares are required to reconstitute the approximated short representation $S\_FGPRN'_{k'}$.

The access device AUTH_STAT comprises an emitter XMIT' arranged in order to transmit each one $S\_FGPRN'_{i,k'}$ of these N short shares $S\_FGPRN'_{1,k'}, S\_FGPRN'_{2,k'}, \ldots S\_FGPRN'_{i,k'}, \ldots S\_FGPRN'_{N,k'}$ to a respective server $SRV_i$ among the N servers $SRV_1, \ldots SRV_i, \ldots SRV_N$.

According to a possible implementation, each server $SRV_i$ comprises a calculating circuit $PROC_i$ arranged to determine, in an at least partially local manner to each server $SRV_i$, K shares of distances measured between the short share $S\_FGPRN'_{i,k'}$ received and K short shares $S\_FGPRN_{i,1}, S\_FGPRN_{i,2}, \ldots S\_FGPRN_{i,K}$ that said server $SRV_i$ has stored beforehand.

The N servers $SRV_1, \ldots SRV_i, \ldots SRV_N$ include calculating circuits $PROC_1, \ldots PROC_i, \ldots PROC_N$ arranged in order to implement a distributed calculation of the shares of distances between the approximated short representation $S\_FGPRN'_{k'}$ and each one of the K approximated short representations $S\_FGPRN_1, S\_FGPRN_2, \ldots S\_FGPRN_K$ stored in a distributed manner on the N servers $SRV_1, \ldots SRV_i, \ldots SRV_N$ (for example on the basis of N*K distances measured by a calculation circuit $PROC_i$).

Each server $SRV_i$ comprises an emitter $XMIT_i$ arranged to transmit, to a receiver RCV of the access device AUTH_STAT, shares $FGPRN_{i,k1}, \ldots FGPRN_{i,kj}, \ldots FGPRN_{i,kp}$ corresponding to the short representations $S\_FGPRN_{k1}, \ldots S\_FGPRN_{kj}, \ldots S\_FGPRN_{kp}$ of which the distance with the approximated short representation $S\_FGPRN'_{k'}$ is less than a determined threshold.

The access device AUTH_STAT comprises an obtaining electronic circuit GEN_FGPRN arranged to obtain, using received shares $FGPRN_{1,k1}, \ldots FGPRN_{1,kj}, \ldots FGPRN_{1,kp}$, $FGPRN_{2,k1}, \ldots FGPRN_{2,kj}, \ldots FGPRN_{2,kp}$, $FGPRN_{N,k1}, \ldots FGPRN_{N,kj}, \ldots FGPRN_{N,kp}$, the corresponding confidential data $FGPRN_{k1}, \ldots FGPRN_{kj}, \ldots FGPRN_{kp}$.

The details of implementing the method according to the second embodiment are transposed to the device according to the eighth embodiment and reciprocally.

According to a ninth embodiment, the K distances measured by a secure access system according to the sixth embodiment are K Hamming distances.

According to a possible implementation, the system comprises the following elements for the calculation of a Hamming distance between the short share $S\_FGPRN'_{i,k'}$ and a short share $S\_FGPRN_{i,j}$ stored beforehand in a server $SRV_i$.

Calculating circuits $PROC_1, \ldots PROC_i, \ldots PROC_N$ of the N servers $SRV_1, \ldots SRV_i, \ldots SRV_N$ are arranged in order to perform a secure distributed calculation of the product of said two short shares $S\_FGPRN'_{i,k'}, S\_FGPRN_{i,j}$.

A calculation circuit $PROC_i$ of said server $SRV_i$ is arranged in order to perform a local calculation of the double of said product of said two short shares $S\_FGPRN'_{i,k'}, S\_FGPRN_{i,j}$.

A calculation circuit $PROC_i$ of said server $SRV_i$ is arranged to perform a local calculation of a sum of said two short shares $S\_FGPRN'_{i,k'}, S\_FGPRN_{i,j}$.

A calculation circuit $PROC_i$ of said server $SRV_i$ is arranged to perform a local calculation of the Hamming distance by subtraction of said double of said product of said two short shares $S\_FGPRN'_{i,k'}, S\_FGPRN_{i,j}$ from said sum of said two short shares $S\_FGPRN'_{i,k'}, S\_FGPRN_{i,j}$.

The details of implementing the method according to the fifth embodiment are transposed to the device according to the ninth embodiment and reciprocally.

According to a tenth embodiment, the confidential data of a secure access system according to one of the eighth or ninth embodiments is biometric data.

The details of implementing the method according to the sixth embodiment are transposed to the device according to the tenth embodiment and reciprocally.

According to an eleventh embodiment, a computer program comprises a series of instructions when, when they are executed by a processor, leading the processor to implement a method according to one of the first to the sixth embodiments.

This computer program can be written in any suitable programming language, such as assembler, the C language, the Java language, etc.

This eleventh embodiment comprises substantially two types of computer programs.

It comprises on the one hand computer programs having the vocation to implement a method of secure distributed storage according to the first embodiment. According to a possible implementation, these programs are stored in a recording device ENR_STAT and are executed by a processor of this recording device ENR_STAT.

It comprises on the other hand computer programs having the vocation to implement a secure access method according to one of the second to the sixth embodiments. According to a possible implementation, these programs are separated into a portion stored in an access device AUTH_STAT (and having the vocation to be executed by a processor of this access device AUTH_STAT) and a set of portions (which can be identical) each one stored in a respective server $SRV_i$ (and having the vocation to be executed by a processor of this server $SRV_i$).

According to a twelfth embodiment, a non-transitory storage medium that can be read by a computer stores a computer program according to the eleventh embodiment. This storage medium is for example a memory of the RAM type saved by battery, or EEPROM, or ROM, or Flash, or a magnetic memory or an optical memory.

The principles, representative embodiments, and modes of operation of the present disclosure have been described in the foregoing description. However, aspects of the present disclosure which are intended to be protected are not to be construed as limited to the embodiments described hereinabove by way of non-limited examples. For example, the third and fourth embodiments are obviously transposable to a secure access system according to the eighth embodiment. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for secure distributed storage, on N servers, where N is an integer greater than 1, of confidential data, the method comprising, at a recording device:
   obtaining confidential data,
   obtaining an approximated short representation of the confidential data,
   obtaining N shares of the confidential data such that at least t shares among the N shares are required in order to reconstitute the confidential data, where t is an integer threshold of at least 2 and at most N, and obtaining N short shares of the approximated short representation such that at least t short shares among the N short shares are required to reconstitute the approximated short representation,
   transmitting the N shares to the N servers, respectively, and the N short shares to the N servers, respectively, in order to store the N shares and the N short shares in the N servers.

2. A method of secure access to confidential data stored in a secure and distributed manner on N servers, where N is an integer greater than 1, wherein a number K greater than 1 of confidential data and a number K of approximated short representations of the K confidential data are stored in a secure and distributed manner on the N servers, the method comprising, at an access device:
   obtaining N first short shares of a first approximated short representation of first confidential data such that at least t first short shares among the N first short shares are required in order to reconstitute the first approximated short representation, where t is an integer threshold of at least 2 and at most N,
   transmitting the N first short shares,
   receiving shares of at least one selected confidential data among the K confidential data, wherein the at least one confidential data is selected among the K confidential data based on K distances, each of the K distances being calculated, through distributed calculation, between the first approximated short representation and a respective approximated short representation among the K approximated short representations stored in a distributed manner on the N servers,
   obtaining the at least one selected confidential data using the received shares.

3. The method of secure access according to claim 2, wherein the distributed calculation comprises:

determining, by each of the N servers, K shares of distances measured between:
  a first short share of the first approximated short representation transmitted by the access device to the server, and
  K short shares of the K approximated short representations, stored on the server, and
measuring the distance between the first approximated short representation and an approximated short representation among the K approximated short representations, by combining, among said N*K shares of distances, the N shares of distances measured respectively by each server between:
  a short share of the approximated short representation stored on the server and
  a first short share of the first approximated short representation transmitted by the access device to the server.

4. The method of secure access according to claim 2, wherein the distributed calculation comprises:
determining by each of the N servers, K shares of distances measured between:
  a first short share of the first approximated short representation, transmitted by the access device to the server, and
  K short shares of K approximated short representations, stored on the server,
and wherein the method comprises:
securely comparing a threshold to the distance measured between the first approximated short representation and an approximated short representation among the K approximated short representations by applying a secure distance calculating protocol at N shares of distances, among said N*K shares of distances, said N shares of distances being the shares of distances measured respectively by each of the N servers between:
  a short share of the approximated short representation stored on the server and
  a first short share of the first approximated short representation transmitted by the access device to the server.

5. The method of secure access according to claim 2, wherein the K distances measured are K Hamming distances.

6. The method of secure access according to claim 2, wherein the first confidential data is biometric data.

7. A secure access system, comprising:
an access device; and
N servers,
the secure access system being arranged to provide access to confidential data stored in a secure and distributed manner on the N servers, where N is an integer greater than 1, wherein a number K greater than 1 of confidential data and a number K of approximated short representations of the K confidential data are stored in a secure and distributed manner on the N servers,
wherein the access device comprises
  a sharing electronic circuit configured to share a first approximated short representation of a first confidential data in N first short shares, such that at least t first short shares among the N first short shares are required in order to reconstitute the first approximated short representation, where t is an integer threshold of at least 2 and at most N, and
  an emitter arranged to transmit the N first short shares;
and the N servers comprise processing circuits arranged to implement a distributed calculation of K distances, each of the K distances being calculated, through distributed calculation, between the first approximated short representation and a respective approximated short representation among the K approximated short representations, stored in a distributed manner on the N servers,
each server comprising an emitter arranged to transmit, to a receiver of the access device, the shares of at least one selected confidential data among the K confidential data, wherein the at least one confidential data is selected among the K confidential data based on K distances, each one distance calculated through distributed calculation, between the first approximated short representation and an approximated short representation among K approximated short representations, stored in a distributed manner on the N servers,
wherein the access device further comprises an obtaining electronic circuit arranged to obtain, from the shares received by the access device, the corresponding confidential data.

8. The secure access system according to claim 7, wherein the K distances measured are K Hamming distances.

9. The secure access system according to claim 7, wherein the confidential data is biometric data.

10. A non-transitory computer readable storage medium storing a computer program comprising a series of instructions, which, when they are executed by a processor, cause the processor to carry out a method according to claim 1.

11. The method of secure access according to claim 2, wherein the at least one confidential data is selected among the K confidential data if the distance, between the at least one confidential data and the first approximated short representation is less than a non-negative threshold d.

12. A recording device for secure distributed storage, on N servers, where N is an integer greater than 1 of confidential data, the recording device comprising:
a first circuit configured to obtain a piece of confidential data,
a second circuit configured to extract an approximated short representation of the confidential data,
a third circuit configured to share the confidential data in N shares such that at least t shares among the N shares are required in order to reconstitute the confidential data, where t is an integer threshold of at least 2 and at most N, and for sharing the approximated short representation in N short shares such that at least t short shares are required to reconstitute the approximated short representation,
an emitter arranged to transmit the N shares to the N servers, respectively, and the N short shares to the N servers, respectively, in order to store the N shares and the N short share in the N servers.

* * * * *